3,819,710
PROCESS FOR IMPROVING COLOR AND COLOR STABILITY OF ETHANOLAMINES
Thomas E. Jordan, Louisville, Ky., assignor to
Olin Corporation
No Drawing. Filed Jan. 4, 1973, Ser. No. 320,918
Int. Cl. C07c *89/04, 91/04*
U.S. Cl. 260—584 R                10 Claims

ABSTRACT OF THE DISCLOSURE

Process for improving the color and color stability of ethanolamines by hydrogenation of crude mono-, di- and tri-ethanolamine using selected catalysts at selected temperatures and pressures.

---

This invention relates to a process wherein improved color and color stability of ethanolamines can be obtained by the hydrogenation of crude mono- di- and triethanolamine under selected conditions.

Ethanolamines have been prepared for many years by reacting ethylene oxide with ammonia. Generally the products obtained by this method have an undesirable color and also have exhibited a high degree of color instability over a period of time particularly when exposed to higher temperatures. Although the nature of this problem has not been definitely established, it is believed to be associated with the presence of minor quantities of impurities, such as aldehydes.

Various attempts to overcome the problem associated with color and color instability as noted above, have generally proven unsuccessful. Such attempts have included purification by fractional distillation, concentration of the color forming bodies or their precursors by fractional distillation, carbon treatment, various hydrogenation techniques and the use of reducing agents such as sodium borohydride and hydrazine.

Now it has been found that the problems of color and color stability of ethanolamines can be overcome by the process of this invention wherein crude ethanolamines are subjected to hydrogenation using selected catalysts and selected conditions. More particularly, the process of this invention involves hydrogenation of crude ethanolamines using a Raney nickel, platinum, palladium or ruthenium catalyst with Raney nickel being the most preferred.

The hydrogenation is carried out at a temperature of from about 60 to about 130° C. and preferably about 80 to about 110° C. The pressure conditions can vary from about 14.7 to about 1000 p.s.i.g. and preferably from about 50 to about 250 p.s.i.g.

The amount of catalyst employed can vary from about 1 to about 30 percent by weight of the ethanolamines and preferably from about 5 to about 10 percent. The amount of hydrogen employed will be satisfactory if it is sufficient to maintain the pressure conditions noted above.

The hydrogenation process of this invention may be applied to a mixture of two or more of the crude ethanolamines of mono-, di- and triethanolamine or to each crude ethanolamine independently. The term "crude" ethanolamines can be defined as follows. The ethanolamines which are generally prepared by reacting ethylene oxide with ammonia aqueous solution are purified by separating the unreacted ammonia and a major portion of the water from the reaction product. The resulting mixture is the crude ethanolamine containing mono-, di- and triethanolamine. The crude ethanolamines are then delivered to a first distillation column where the monoethanolamine is separated, after which the bottom liquid (crude diethanolamine) is delivered to a second distillation column where the diethanolamine is separated, and thereafter the bottom liquid (crude triethanolamine) is delivered to a third distillation column where the triethanolamine is separated. Generally the problem of color and color stability is more critical in the case of diethanolamine and triethanolamine and even more so in the case of the triethanolamine. Consequently the hydrogenation process is more usually applied to the crude diethanolamines and triethanolamines.

The reaction time can be varied widely and is generally dependent on the pressure conditions and the amount of catalyst used. Generally the reaction will be run for from about 0.25 to about 4 hours.

The reaction is preferably run while agitating the reaction mixture. The degree of agitation can vary widely depending on the geometry of the reactor vessel and the agitator. Generally the degree of agitation will be at least about 200 r.p.m. and preferably at least about 500 r.p.m.

Using the hydrogenation process of this invention APHA colors 5 to 10 were generally obtained as compared to APHA colors of 35 to 100 for ethanolamine products that were not subjected to such process. The distinction was even more pronounced when the products were subjected to elevated temperatures. These results were particularly surprising when it is considered that other attempts to improve the color and color stability of ethanolamines including various hydrogenation techniques as noted earlier, were generally unsuccessful.

The following examples are presented to describe the invention more fully without any intention of being limited thereby. All parts and percentages are by weight unless otherwise specified.

EXAMPLE I

A sample of crude triethanolamine (99% triethanolamine) was charged into a one-gallon stainless steel reactor and hydrogenated for two hours and using 1 percent by weight of Raney nickel catalyst, based on the weight of crude triethanolamine. The temperature was maintained at 99° C. and gaseous hydrogen charged in and maintained at a pressure of 55 p.s.i.g. The reactor contents were agitated at 700 r.p.m.

The distilled color (APHA), i.e. the color after evaporation in a rotary flash evaporator with approximately ninety percent distillate recovery, was determined for the hydrogenated sample and found to be 5. The distilled color of a non-hydrogenated sample taken from the same batch of crude triethanolamine was found to be 10 (APHA).

The heat test color (an accelerated aging test) of both the hydrogenated and unhydrogenated sample were determined after heating the samples to 160° C. under reduced pressure and then cooling slowly. The APHA color for the non-hydrogenated sample was 100 and for the hydrogenated sample was 15.

EXAMPLE II

The same procedure as in Example I was followed except that 3 percent by weight of Raney nickel catalyst was used.

The distilled color for the non-hydrogenated sample was 30 (APHA) and for the hydrogenated sample it was 5 (APHA). The heat test color for the non-hydrogenated sample was 65 (APHA) and that for the hydrogenated sample was 15 (APHA).

EXAMPLE III

The same procedure as in Example I was followed except that 5 percent by weight of Raney nickel catalyst was used.

The distilled color for the non-hydrogenated sample was 30 (APHA) and for the hydrogenated sample it was 5 (APHA). The heat test color for the non-hydrogenated sample was 65 (APHA) and for the hydrogenated sample it was 10 (APHA).

Another test to determine the color stability of the samples was made by placing the hydrogenated sample in a hot room at 125° F. under an air atmosphere without any stabilizer additives. After 111 days the color was 40 (APHA). For a non-hydrogenated sample the color was greater than 150 (APHA) after 111 days.

EXAMPLE IV

The same procedure as in Example I was followed except that 7 percent by weight of Raney nickel catalyst was used.

The distilled color for the non-hydrogenated sample was 30 (APHA) and for the hydrogenated sample it was 5 (APHA). The heat test color for the non-hydrogenated sample was 65 (APHA) and for the hydrogenated sample it was 10 (APHA).

The color after 111 days in the hot room was 70 (APHA) for the hydrogenated sample and greater than 200 (APHA) for the non-hydrogenated sample.

EXAMPLE V

The same procedure as in Example I was followed using crude triethanolamine (88% triethanolamine), 5 percent by weight of Raney nickel catalyst, agitation at 500 r.p.m. and the hydrogenation was run for 0.75 hours.

The distilled color for both the non-hydrogenated and hydrogenated samples was 5 (APHA). The heat test color was 80 (APHA) for the non-hydrogenated sample and 20 (APHA) for the hydrogenated sample.

The color after 68 days in the hot room was 50 (APHA) for the non-hydrogenated sample and 25 (APHA) for the hydrogenated sample.

EXAMPLE VI

The same procedure as in Example I was followed using crude triethanolamine (88% triethanolamine), 20 percent by weight of Raney nickel catalyst, agitation at 1000 r.p.m., hydrogen charged in an maintained at a pressure of 120 p.s.i.g. and the hydrogenation was run for 0.25 hours.

The distilled color for both the non-hydrogenated and hydrogenated samples was 5 (APHA). The heat test color was 50 (APHA) for the non-hydrogenated sample and 15 for the hydrogenated sample.

The color after 68 days in the hot room was 70 (APHA) for the non-hydrogenated sample and 20 (APHA) for the hydrogenated sample.

EXAMPLE VII

The same procedure as in Example I was followed using a ten-gallon stainless reactor, crude triethanolamine (88% triethanolamine), 5 percent by weight of Raney nickel catalyst, agitation at 200 r.p.m., a pressure of 250 p.s.i.g. and a run time of 2 hours.

The distilled color for the non-hydrogenated sample was 10 (APHA) and 5 (APHA) for the hydrogenated sample. The heat test color was 90 (APHA) for the non-hydrogenated sample and 5 (APHA) for the hydrogenated sample.

The color after 64 days in the hot room was 65 (APHA) for the non-hydrogenated sample and 10 (APHA) after 63 days for the hydrogenated sample.

EXAMPLE VIII

A sample of crude triethanolamine (88% triethanolamine) was continuously charged into a one-gallon stainless steel reactor and hydrogenated over a period of 6 hours with the average residence time being 1.28 hours. A 29.4 percent by weight Raney nickel catalyst, based on the weight of crude triethanolamine, was used and the temperature was maintained at 99° C. and gaseous hydrogen charged in an maintained at 120 p.s.i.g. The reactor contents were agitated at 600 r.p.m.

Color determinations as in Example I were made. The distilled color for a non-hydrogenated sample was 10 (APHA) and for the hydrogenated sample was 5 (APHA). The heat test color for the hydrogenated sample was 90 (APHA) and 5 (APHA) for the hydrogenated sample.

The color after 64 days in the hot room was 65 (APHA) for the non-hydrogenated sample and 5 (APHA) after 55 days for the hydrogenated sample.

What is claimed is:

1. A process for improving the color and color stability of ethanolamines comprising hydrogenating crude ethanolamines prepared by the reaction of ammonia with ethylene oxide in the presence of hydrogen and a catalyst selected from the group consisting of Raney nickel, platinum, palladium and ruthenium, at a temperature of from about 60 to about 130° C. and a pressure of from about 14.7 to about 1000 p.s.i.g., the amount of said catalyst being from about 1 to about 30 percent by weight, based on the weight of crude ethanolamines.

2. The process of claim 1 wherein said catalyst is Raney nickel.

3. The process of claim 1 wherein said temperature is from about 80 to about 110° C.

4. The process of claim 3 wherein said pressure is from about 50 to about 250 p.s.i.g.

5. The process of claim 4 wherein from about 5 to about 10 percent by weight of said catalyst is used.

6. The process of claim 5 wherein said catalyst is Raney nickel.

7. The process of claim 6 wherein said crude ethanolamines is a mixture of mono-, di- and triethanolamine.

8. The process of claim 6 wherein said crude ethanolamines is crude diethanolamine.

9. The process of claim 6 wherein said crude ethanolamines is crude triethanolamine.

10. The process of claim 6 wherein the reaction mixture is subjected to agitation while the reaction is being carried out.

References Cited

UNITED STATES PATENTS 2,586,325    2/1952    Gresham    260—584 R

OTHER REFERENCES

Radiation Res. 47, 612–27 (1971).

LEWIS GOTTS, Primary Examiner

D. R. PHILLIPS, Assistant Examiner